United States Patent [19]

Cygnor et al.

[11] Patent Number: 4,631,009
[45] Date of Patent: Dec. 23, 1986

[54] LUBRICATION SCAVENGE SYSTEM

[75] Inventors: John E. Cygnor; John Hallman, both of Rockford, Ill.

[73] Assignee: Sundstrand Corporation, Rockford, Ill.

[21] Appl. No.: 631,922

[22] Filed: Jul. 18, 1984

[51] Int. Cl.[4] .......................... F04C 2/18; F04C 15/00
[52] U.S. Cl. ...................... 418/15; 418/132; 60/39.08
[58] Field of Search ............... 418/15, 132, 135, 131; 60/39.08

[56] References Cited

U.S. PATENT DOCUMENTS

| | | | |
|---|---|---|---|
| 2,824,522 | 2/1958 | Compton | 418/132 |
| 3,018,641 | 1/1962 | Carpigiani | 418/15 |
| 3,073,251 | 1/1963 | Weigert | 418/132 |
| 3,137,238 | 6/1964 | Gordon | 418/132 |
| 3,435,773 | 4/1969 | Gustafsson | 418/15 |
| 3,666,383 | 5/1972 | Werner | 418/15 |
| 4,025,056 | 5/1977 | Miles et al. | 418/15 |
| 4,108,582 | 8/1978 | Bitton | 418/132 |

FOREIGN PATENT DOCUMENTS 733868 4/1943 Fed. Rep. of Germany ........ 418/15
125139 5/1959 U.S.S.R. ....................... 418/15

OTHER PUBLICATIONS

A.P.C. Application of Waltenbauer, Ser. No. 261,139, published Apr. 27, 1943.
Casamassa et al, *Jet Aircraft Power Systems*, McGraw-Hill Book Co. Inc., N.Y., 1957, pp. 145, 146.

*Primary Examiner*—John J. Vrablik
*Attorney, Agent, or Firm*—Wood,Dalton,Phillips Mason & Rowe

[57] ABSTRACT

A lubrication scavenge system for an engine bearing compartment or the like utilizing a gear pump with two or more independent inlets with separate flow paths through the pump. The inlets and flow paths are maintained separate from each other by the use of inlet and discharge seal arcs to avoid any fluid communication therebetween. The pump can operate to pump different fluids through each inlet with the fluid being either a gas or liquid or a mixture of both and with the pump continuing its pumping action when there is an instantaneous interchange in the fluid being pumped at each inlet as can occur when the engine bearing compartment is subjected to varying positive and negative gravity forces.

6 Claims, 5 Drawing Figures

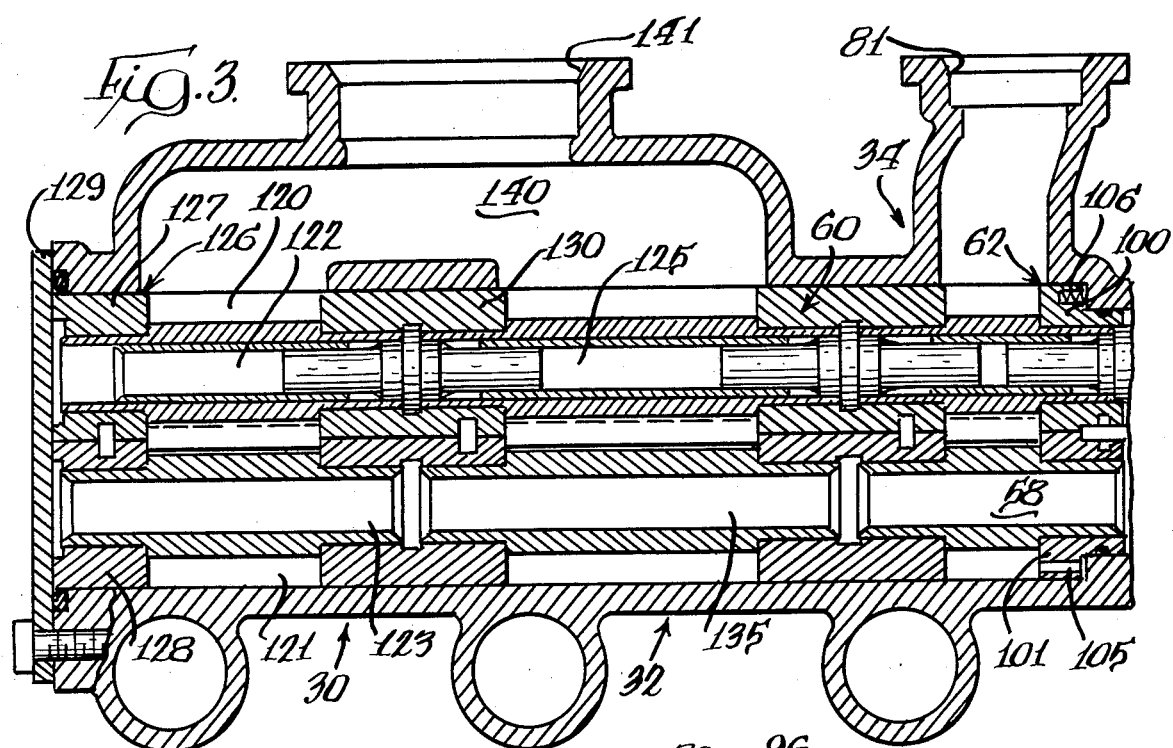
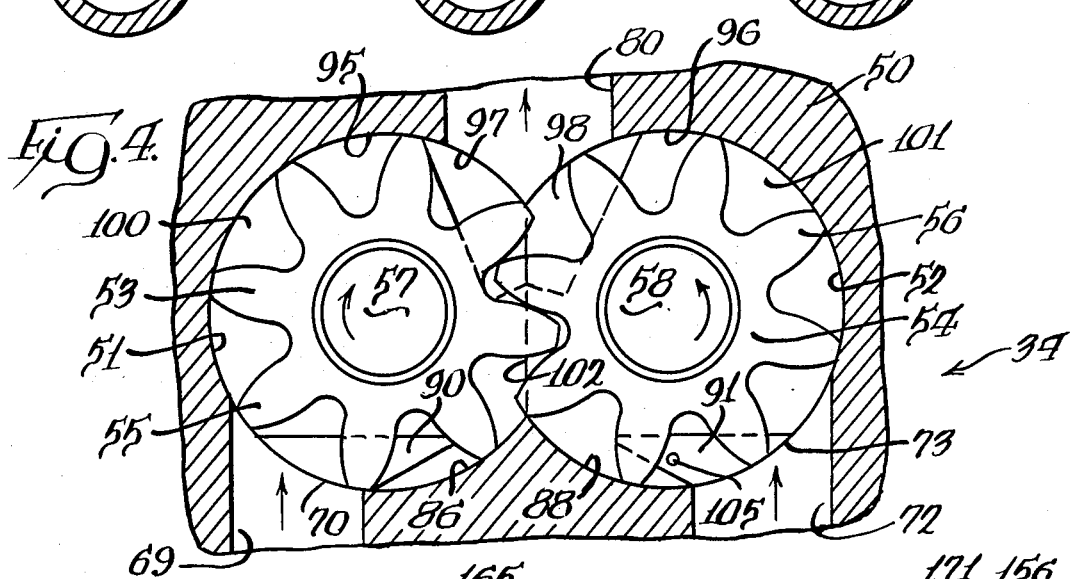
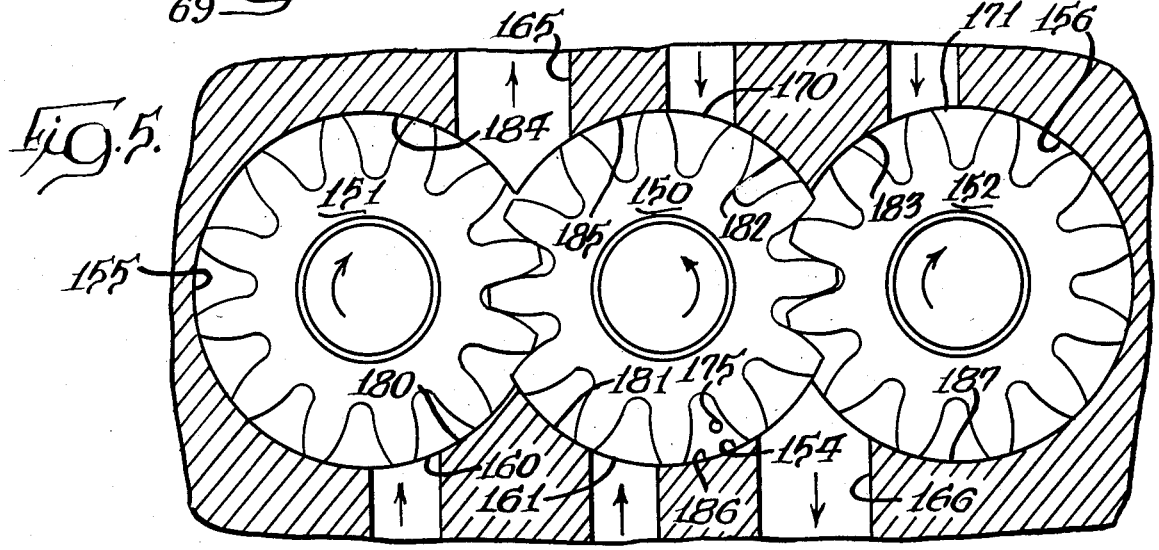

LUBRICATION SCAVENGE SYSTEM

DESCRIPTION

Technical Field

This invention relates to a lubrication scavenge system and, more particularly, to such a system utilizing a dual inlet gear pump having a pair of separate inlet ports individually connectable to separate scavenge pickup locations at one or more engine bearing compartments of an aircraft engine and which will provide continuous scavenging under both positive and negative gravity conditions.

BACKGROUND OF THE INVENTION

A modern gas turbine aircraft engine may be subjected to extremes of operating attitudes and either negative or positive gravity conditions resulting from either the rotation of the engine nacelle relative to the airframe and/or flight maneuvers. It is typical to have a number of engine bearing compartments mounting bearings for the aircraft engine shaft and with the bearings being lubricated and cooled by oil delivered under pressure. The engine bearing compartment is sealed by labyrinth seals which are externally exposed to air under pressure which results in air in the engine bearing compartment in addition to the lubricating and cooling oil.

It is important to continuously remove lubricating and cooling oil from the engine bearing compartment to avoid the possibility of a flooded bearing compartment. The flooding of an engine bearing compartment would result in overheated bearings caused by the churning losses of flooded bearings or, in the worst case, an engine fire caused by oil leakage through the compartment shaft sealing system into hot sections of the engine.

The conventional solution to removal of lubricating and cooling oil is a lubrication scavenge system utilizing a pump having an inlet connected to an outlet at the engine bearing compartment. When the engine is subject to the extremes of operating attitudes and the negative and positive gravity forces, as previously mentioned, it is necessary to have two scavenge pickup locations at the engine bearing compartment wherein two outlets are located at different positions, with one scavenge pickup being located to withdraw lubricating and cooling oil under normal operation and the other outlet being positioned to withdraw lubricating and cooling oil under conditions other than normal operations, such as negative gravity forces. When operating under negative gravity forces, the lubricating and cooling oil collected in the sump of the engine bearing compartment as well as the air contained therein shift positions and the normal operation of one scavenge pickup being positioned to communicate with oil in the sump and the other to communicate with air in the sump is reversed. In normal operation, the fluid at the normal scavenge pickup will usually be a mixture of air and oil, while, at the other scavenge pickup, only air will be present. This relation reverses during negative gravity operation.

The lubrication scavenge system must operate effectively during normal operation as well as during negative gravity operation and transitions therebetween. The obvious and conventional solution to this problem has been to provide a lubrication scavenge system with two pumps for each engine bearing compartment with one pump being connected to the scavenge pickup outlet for normal operation and the other pump being connected to the other scavenge pickup outlet for negative gravity operation. It has been necessary to use two pumps to isolate the two scavenge pickup outlets from the engine bearing compartment from each other in order to assure that oil or a mixture of air and oil will always be pumped from the scavenge pickup outlet at which the oil is present.

The use of a pair of pumps to assure withdrawal of lubricating and cooling oil from the engine bearing compartment under all operating conditions increases the complexity, weight and size of the lubrication scavenge system because of the doubling of the pumping elements necessary to perform the required functions.

The prior art includes gear pumps having two or more intermeshing gears with plural inlets for pumping fluid from different sources. An example of such a gear pump having two intermeshing gears is the Behrends U.S. Pat. No. 3,420,180 wherein two intermeshing gears communicate with separate inlets for receiving fluid from two sources and discharging the fluid to a common outlet. The Behrends patent includes a bypass or ratio-change passageway extending from one of the pump inlets to the gear associated with the other pump inlet. Part of a mixture of air and oil can flow through the bypass passageway to join the flow of oil being pumped by the last-mentioned gear to assure a flow of cooling oil in a fixed ratio from two separate sources, with the two different fluids being pumped differing in resistance to the pump suction. The gear pump of the Behrends patent would not be effective in a lubrication scavenge system for an engine bearing compartment wherein one pumping element would be pumping air and the other pumping element would be pumping a mixture of air and oil, since the bypass passage would cross-connect the two pumping elements and there would be a leakage of a substantial amount of air to adversely affect the pumping of the mixture of air and oil.

Prior efforts to use a single pump with two inlets from an engine bearing compartment have not been successful, possibly for the reasons set forth in the Behrends patent in that the two fluids being pumped differ in resistance to the pump suction. An undesirably large proportion of one fluid may be pumped as compared to the amount of the other fluid being pumped.

The invention to be described hereinafter distinguishes over the prior art in providing a lubrication scavenge system for bearing compartments subjected to varying gravity conditions which utilizes a dual inlet gear pump that will pump simultaneously from two inlets any combination of gas, liquid or mixture thereof without interaction between the inlets or negative effects on the performance of either inlet and which continues to operate upon a change in fluids present at said inlets.

DISCLOSURE OF THE INVENTION

This invention relates to a lubrication scavenge system utilizing a dual inlet gear pump having two different connections to engine bearing compartments which are subject to varied gravity conditions for simultaneously pumping fluid from a pair of scavenge pickup connections wherein, in normal operation, the fluid at one connection is a mixture of oil and air and the fluid at the other connection is air without interaction between the two pump inlets and with the capability of changeover in fluid flows to the pump inlets under negative gravity conditions without any loss of pumping action.

The use of a dual inlet gear pump having the capability of pumping different fluids from two scavenge pickups of an engine bearing compartment and with continued pumping operation during normal operation, operation under negative gravity conditions or transients therebetween avoids the need for using two pumps for an engine bearing compartment subject to such conditions of operation and therefore reduces the complexity, weight and size required for satisfactory scavenging of lubricating and cooling oil.

The dual inlet gear pump of the lubrication scavenge system has the ability to scavenge air and oil simultaneously from an engine bearing compartment at independent inlet pressures with the inlet volume flow remaining basically the same whether air is at one inlet to the pump and oil at the other inlet to the pump or oil is at both of the pump inlets.

The dual inlet gear pump pumps simultaneously from two scavenge pickup connections, any combination of gas, such as air, liquid, such as oil, or a mixture of both without interaction between the two inlets or without negative effects on the performance of either inlet. This result is achieved without any fluid communication between the two inlets of the pump, with the isolation assuring continuous pumping action when there is a change in fluid at both of the inlet ports as occurring when the engine bearing compartment is subject to negative gravity conditions. The isolation of the two flow paths for the gear pump is achieved by the provision of seal arcs defined by lengths of the wall of the pump chambers in the pump housing which mount the intermeshing rotatable gears. The inlet seal arcs have a length at least equal to the spacing between two adjacent gear tooth tips and are located between the leading edge of each inlet port fill slot and the intersection of the pump chambers adjacent to the inlet mesh region of the pump. The discharge seal arcs are located between the trailing edge of the inlet port fill slots and the edge of the single discharge port and are of the same minimum length as the inlet seal arcs. The inlet port fill slots can be positioned at any position between the inlet seal arcs and the discharge seal arcs.

An object of the invention is to provide a lubrication scavenge system having a dual inlet gear pump which will pump simultaneously and separately from two inlets either air or oil, or a mixture of both, without interaction between two inlets or without negative effects on the performance of either inlet and with the capability of the pump to reprime either inlet without affecting the performance of the other inlet.

Still another object of the invention is to provide a dual inlet gear pump as defined in the preceding paragraph having inlet seal arcs and discharge seal arcs at least equal to the spacing between two adjacent gear tooth tips for isolating a flow path from one inlet to the pump discharge from the flow path from the other inlet to the pump discharge to isolate any flow communication between the two flow paths.

Still another object of the invention is to provide enhanced operation of the dual inlet gear pump by the use of inlet filling ramps to provide for progressive filling of gear tooth spaces in the inlet sector of the pumping elements.

A further object of the invention is to provide enhanced operation of the dual inlet gear pump by providing discharge trapping relief grooves to progressively open gear tooth spaces to the pump discharge.

The dual inlet gear pump has bearing means engaging the end faces of the pumping elements and the bearings can be associated with the pumping elements in a fixed clearance relation or, preferably, the pump can be of a pressure-loaded design to minimize fluid leakage and increase useful operating life by utilizing the pressure-loading principle to axially clamp the bearings to the end faces of the gears. When using the pressure-loading principle, it is important to avoid communication between the inlet flow paths. The only flow communication to the pressure loading areas of the bearings is from one of the inlets provided by an axial hole in only one of the floating bearings, since the conventional system of having an axial hole in each of the bearings associated one with each of the pumping elements would result in flow communication between the two inlets. The single axial hole to communicate with a single inlet is used when the inlet pressure is higher than the discharge pressure and the pump is functioning as a motor. When the pump is functioning as a pump and the discharge pressure is higher, there may be axial holes in each of the bearings in the discharge area of the pump, since both pumping elements communicate with the common discharge port and this does not interconnect the inlets.

A further object of the invention is to provide a lubrication scavenge system for an engine bearing compartment which is subject to negative and positive gravity forces comprising, a dual inlet gear pump having a housing with generally cylindrical pump chambers mounting a pair of meshing oppositely rotatable gears, said housing having a pair of inlet ports connectable separately to different scavenge pickup locations at said bearing compartment and a single discharge port connectable to tank, a pair of fill slots associated one with each of said inlet ports and said gears for delivery of fluid to said gears for two independent flow paths from the fill slots to the common discharge port, and means isolating the two flow paths from each other to avoid any fluid communication between said inlet ports whereby the pump can effectively pump air or oil or a mixture thereof from either scavenge pickup location independently of the other and with interchangeability in the character of the fluid at said scavenge pickup locations upon change in conditions in said engine bearing compartment.

Still another object of the invention is to provide a dual inlet gear pump for pumping fluid from a pair of compartment outlets and wherein the fluid at said compartment outlets may alternate between air or oil or a mixture thereof comprising, a pump housing having a pair of inlet ports for association one with each of said compartment outlets and a single discharge port, a pair of separate fill slots in said housing communicating one with each of said inlet ports, said housing having a pair of generally cylindrical pump chambers, a pair of rotatable meshing gears in said pump chambers which separately rotate past an associated fill slot to carry fluid to the discharge port, portions of the walls of said pump chambers defining inlet and discharge seal arcs for each gear to preclude any direct fluid communication between the inlet ports and between the inlet ports and the discharge port, said inlet seal arcs extending between the leading edge of each fill slot and the intersection of said pump chambers and at least equal to the spacing between adjacent gear tooth tips and the discharge seal arcs being at least equal to the spacing between adjacent gear tooth tips and extending between the discharge port and the trailing edge of the fill slots, and bearing means pressure loaded against the end faces of the gears by fluid flowing through the pump and without creating a flow path between the inlet ports.

Still another object of the invention is to provide a lubrication scavenge system for engine bearing compartments which are subject to negative and positive gravity forces and which contain oil and air comprising, a gear pump having a housing with three generally cylindrical pump chambers, a plurality of rotatable gears positioned one in each of said pump chambers with a central gear in mesh with each of a pair of outer gears to define four flow paths for fluid captured between gear teeth and the walls of the pump chambers with two of said flow paths being defined by teeth of said central gear, said housing having two pairs of inlet ports associated with fill slots with a first pair supplying fluid to said central gear and one of the outer gears, the other pair of inlet ports supplying fluid to said central gear and the other of said outer gears, a first discharge port in said housing for receiving fluid flow from the gears supplied with fluid by one of said first pair of inlet ports and one of said other pair of inlet ports, a second discharge port for receiving fluid flow from the central gear and the other of the outer gears, means defining inlet seal arcs at least equal to the spacing between adjacent gear tooth tips between the leading edge of each inlet fill slot and the intersection of the pump chambers containing said central gear and said outer gears to prevent communication between said fill slots, and means defining discharge seal arcs at least equal to the spacing between adjacent gear tooth tips between the discharge ports and the trailing edge of the inlet fill slots.

BRIEF DESCRIPTION OF THE DRAWINGS

FIG. 3 is a sectional view, taken generally along the line 3—3 in FIG. 2;

FIG. 4 is a diagrammatic view of a portion of the dual element gear pump to assist in illustrating the principles of the invention; and FIG. 5 is a view, similar to FIG. 4, of a three-gear pump having two pairs of dual inlets associated therewith.

BEST MODE FOR CARRYING OUT THE INVENTION

Figure 1:
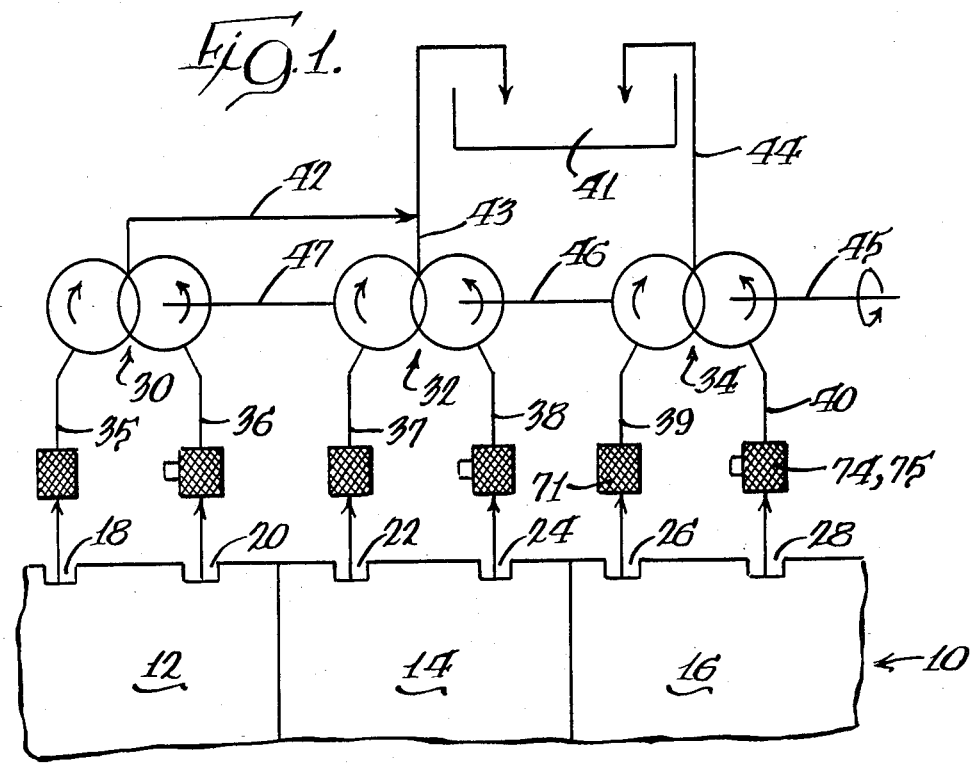
FIG. 1 is a schematic view of a lubrication scavenge system for a plurality of engine bearing compartments for a gas turbine aircraft engine.

The lubrication scavenge system for a gas turbine aircraft engine is shown in FIG. 1. An aircraft engine gearbox, indicated generally at 10, has a number of engine bearing compartments; three of these compartments being shown at 12, 14 and 16 which house bearings for rotatably mounting an engine shaft. The bearings are lubricated and cooled by oil delivered thereto under pressure and each of the bearing compartments is sealed, as by labyrinth seals between the walls of the compartments and the aircraft engine shaft. The compressor of the aircraft engine supplies air under pressure externally of the labyrinth seals to effectively seal the oil within the engine bearing compartments. As a result, there is air within the compartments in addition to the lubricating and cooling oil. Each engine bearing compartment has a sump and the oil and air are scavenged from the sump, with the oil being cooled and returned to the lubricating system.

There must be continuous scavenging of the bearing compartments to preclude flooding of the bearing compartment which would result in overheated bearings caused by churning losses of the flooded bearings or, in an extreme situation, an engine fire caused by oil leakage through the seals, and into hot sections of the engine.

The gas turbine aircraft engine may be subjected to extremes of operating attitudes and negative and positive gravity forces resulting from either rotation of the aircraft engine nacelle or flight maneuvers. The oil or mixture of oil and air positioned at the bottom of the bearing compartment sump in normal operation would, under negative gravity conditions, move to a different position and a position interchanging with air within the sump. In order to draw lubricating and cooling oil from the engine bearing compartment at all times, each engine bearing compartment has two separately located scavenge outlet ports. As seen in FIG. 1, the engine bearing compartment has the scavenge outlet ports 18 and 20 and engine bearing compartments 14 and 16 have the separate scavenge outlet ports 22, 24, 26 and 28, with these scavenge outlet ports being properly positioned so that at least one of the scavenge outlet ports communicates with oil in the engine bearing compartment in all attitudes of the engine.

The invention embodied herein relates to the use of a gear pump having separate inlets for each pumping element of the gear pump for drawing lubricating and cooling oil from engine bearing compartments under all operating conditions and which avoids the need for a separate gear pump for each scavenge outlet port.

More particularly, as seen in FIG. 1, there are three dual inlet gear pumps, indicated generally at 30, 32 and 34. The dual inlet gear pump 30 has a pair of inlets connected to the scavenge outlet ports 18 and 20 of the engine bearing compartment 12 by a pair of fluid lines 35 and 36. The dual inlet gear pump 32 is connected to the scavenge outlet ports 22 and 24 of the engine bearing compartment 14 by a pair of fluid lines 37 and 38. The dual inlet gear pump 34 is connected to the scavenge outlet ports 26 and 28 of the engine bearing compartment 16 by a pair of fluid lines 39 and 40. Each of the dual inlet gear pumps has a single discharge port for delivering lubricating and cooling oil to a circuit including a tank 41, with there being other components such as oil cooling elements in the circuit. These connections to the circuit are indicated by discharge lines 42, 43 and 44, with discharge line 42 connecting into the discharge line 43.

A drive for the dual inlet gear pumps is provided by an input shaft 45 which can be splined to a drive shaft for the dual inlet gear pump 34 and with interconnecting drive shafts connected to the dual inlet gear pumps 30 and 32 by spline drive connections.

Figure 2:
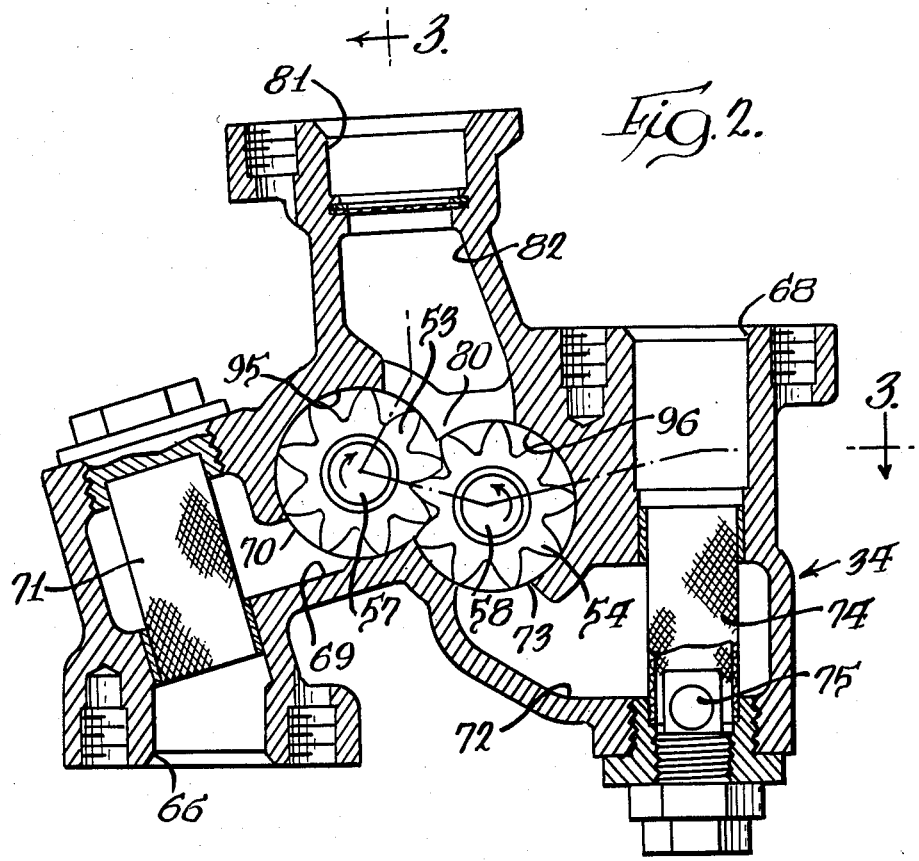
FIG. 2 is a transverse section through a dual inlet gear pump utilized in the lubrication scavenge system.

A module having three dual element gear pumps 30, 32 and 34 is shown in FIG. 3 and with the structure of the dual inlet gear pump 34 being shown particularly in FIGS. 2 and 4.

The structure of the dual inlet gear pump 34 will be described in detail, with this description being applicable to all three of the pumps shown. A pump housing 50 has a pair of generally cylindrical pump chambers 51 and 52, each of which houses one of a pair of intermeshing gears. The gears are a pair of spur gears 53 and 54, each having a series of teeth 55 and 56, respectively, and which are mounted on rotatable shafts 57 and 58 which are supported in bearings 60 and 62 which will be described more particularly hereinafter.

The shaft 57 is splined to the drive shaft 45 to rotate the pumping elements in opposite directions as shown by the arrows in FIG. 4. The pump housing 50 has an inlet port 66 which is connectable to the fluid line 39 for connection to the scavenge pickup outlet port 26 which communicates with air in the engine bearing compartment in normal operation. The housing 50 has a second inlet port 68 which is connectable to the fluid line 40 connected to the scavenge pickup outlet port 28 and which communicates with oil or an oil-air mixture in the engine bearing compartment in normal operation. The inlet port 66 communicates with a passage 69 in the housing, terminating in a fill slot 70 for the gear 53. The passage 69 has a filter screen 71 therein. The inlet port 68 communicates with a passage 72 in the housing 50 which terminates in a fill slot 73 for the gear 54. The passage 72 has a filter screen 74 positioned therein and also a magnetic chip detector 75.

With the rotation of the pumping elements 53 and 54, as shown in FIGS. 2 and 4, fluid at the fill slots will enter the tooth spaces between respective gear teeth 55 and 56 and be captured between the teeth and the walls of the pump chambers 51 and 52 for transport in flow paths to a discharge port 80 which communicates with an outlet 81 through a communicating passage 82. The fluid carried around by the pumping elements is caused to flow through the discharge port 80 because of the intermesh of the gear teeth 55 and 56 in an intermesh region which is generally coincident with the intersection between the two generally cylindrical pump chambers.

For proper functioning of the dual inlet gear pump, it is necessary to assure that there is no flow communication between the two inlets. With there being simultaneous pumping of volumes of air and oil, or an oil/air mixture, from the two scavenge pickup outlet ports of an engine bearing compartment, there can be adverse effects on the pumping of the oil, or oil and air mixture, if there is flow communication between the two flow paths. The means for maintaining separate flow paths includes a pair of inlet seal arcs 86 and 88 defined by lengths of the walls of the pump chambers 51 and 52 which are located between the intersection of the pump chambers 51 and 52 and the leading edge of the fill slots 70 and 73 and are at least equal in length to the spacing between the tips of adjacent gear teeth. The inlet seal arcs assure that there can never be communication between the fill slots. In order to provide smoother operation, there can be progressive filling of the gear tooth spaces from the fill slots 70 and 73 by provided sloped inlet filling ramps in the surfaces of the bearings 60 and 62 which are adjacent the end faces of the gears. The bearings 62, as shown in FIG. 4, have the inclined inlet filling ramps 90 and 91 communicating with the fill slots 70 and 73 and are progressively reduced in cross section and terminate flush with the face of the bearings at a location to not adversely affect the inlet seal arcs 86 and 88.

The means for maintaining separate flow paths further includes discharge seal arcs formed by lengths of the walls of the pump chambers 51 and 52 which are identified at 95 and 96 and which extend between the discharge port 80 and the trailing edges of the fill slots 70 and 73, for a length at least equal to the spacing between adjacent gear tooth tips of the pumping elements to effectively seal the pump inlets from the discharge port 80. The inlet fill slots 70 and 73 can be at any location between the inlet and discharge seal arcs.

To provide smoother operation, a pair of discharge trapping relief grooves 97 and 98 can be formed in the faces of the bearings 60 and 62 to permit escape of fluid to the discharge port 80 as the teeth 55 and 56 progressively move into full mesh.

The bearings 60 and 62 are each formed of two generally cylindrical members, with the bearing members 100 and 101 of the bearings 62 being shown in FIGS. 3 and 4 and with the sides in abutting relation, as seen at 102 in FIG. 4 and as well known in the art. The pump can be assembled with the bearings 60 and 62 having a fixed clearance with the end faces of the pumping elements. Preferably, the bearings are pressure loaded, with the bearing 60 being a floating bearing and pressure being applied to the remote faces of the bearing members 100 and 101 of the bearing 62. This pressure loading provides high efficiency air pumping capability and high volumetric efficiency when pumping oil.

The pump can function in either a pumping mode or a metering mode. In a pumping mode, the pressure of fluid discharged is higher than inlet pressure, while in a metering mode, the inlet pressure of the fluid is higher than the discharge pressure. In a metering mode, inlet pressure is ported to the remote faces of the bearing members 100 and 101, with this porting being through an axial hole 105 extending through the bearing member 101 whereby inlet pressure can be applied to preselected areas on the remote face of the bearing members 100 and 101.

The porting is to only one inlet port to avoid any flow communication between both inlets which would occur if there were also an axial hole in the bearing member 100. An axial load is established which is proportional to the differential pressure across the pumping elements to seal the gear end faces to the bearings which reduces internal leakage from the high pressure side to the low pressure side.

Each of the bearing members 100 and 101 also has a series of recesses mounting springs, one of which is shown at 106, to exert a light clamping force of the bearing members against the end faces of the gears to effect a good seal during start-up or priming of the pump. Additionally, the pressure loading of the bearings assists in preventing of leakage of oil back into the bearing compartment of oil trapped within the pump upon shut-down of the engine.

When the bearings 100 and 101 are to be discharge pressure loaded, there can be an axial hole, similar to the hole 105 in each of the bearing members 100 and 101 which communicate with the discharge port area, since axial holes in both bearings at that location would not result in any flow communication between the two separate inlets of the pump.

Referring to FIG. 3, the entire module will now be further described. The pump housing 50 also houses the dual inlet gear pumps 30 and 32. The dual inlet gear pump 30 has intermeshing gears 120 and 121 on shafts 122 and 123 comparable to the gears 53 and 54 and shafts 57 and 58. The shaft 122 is driven by a spline connection to a shaft 125 of the dual inlet gear pump 32 and the shafts are supported by a fixed bearing 126 having bearing members 127 and 128 comparable to bearing members 100 and 101, but without fluid pressure applied directly thereto. These bearings are held in the housing 50 by an end plate 129. There is the additional floating bearing 130 which supports the shafts 122 and 123 and also supports the driven shaft 125 and a shaft 135 of the dual inlet gear pump 32. The shaft 125 is splined to the shaft 57 of the dual inlet gear pump 34 with the shafts of the dual inlet gear pump 32 being supported by the previously mentioned floating bearing 60. The bearings 60 and 130 are floating bearings whereby pressure applied to the remote faces of the bearing members 100 and 101 of the bearing 62 will exert pressure between the end faces of the pumping elements and the adjacent bearings of all of the dual inlet gear pumps. The discharge lines 42 and 43, referred to in FIG. 1, are provided by a common discharge opening 140 in the housing 50 for the dual inlet gear pumps 30 and 32 and which extends to a discharge opening 141.

Each of the dual inlet gear pumps will pump simultaneously and separately from two inlets a gas, such as air, and a liquid, such as oil, or a mixture of both, without interaction between the inlets or without negative effects on the performance of either inlet. The pump will reprime either inlet without affecting the performance of the other inlet. This transition between fluids or the mixture thereof at the two inlets can be switched during operation without any loss of performance. The dual inlet gear pump enables the use of a single pumping element, namely, a gear for each scavenge outlet port and, thus, a single gear pump can be used for two scavenge port outlets for an engine bearing compartment to avoid the complexity, weight and size penalty associated with the conventional approach of using two gear pumps for each bearing compartment.

Another embodiment of the invention is diagrammatically illustrated in FIG. 5 wherein the pump can have three pumping elements associated with four independent inlet ports and two discharge ports. With the use of three gears as the three pumping elements, there is an effective displacement equivalent to two gear pumps, each having two pumping elements. This eliminates one gear and associated bearing. This construction has a central gear 150 and a pair of outer gears 151 and 152 mounted in the generally cylindrical respective pump chambers 154, 155, and 156.

A pair of inlet fill slots 160 and 161 separately communicate with the gears 150 and 151 whereby, with these gears rotating in the direction shown by the arrows, there will be two separate flow paths, with the flow from fill slot 160 flowing to a discharge port 165 and the flow from the inlet fill slot 161 flowing to a discharge port 166.

There are two additional inlet fill slots 170 and 171 associated with the central gear 150 and the outer gear 152. There is a flow path from the inlet fill slot 170 to the discharge port 165 to join flow from the flow path defined by the outer gear 151. The flow from the inlet fill slot 171 travels along a flow path to the discharge port 166 which is common to the flow path of the central gear 150 from the inlet fill slot 161. The three-gear unit has the same structural components as the two-gear unit described in FIGS. 1 to 4 and with the only variation being the additional meshing outer gear and bearing. There are bearings engaging the end faces of the gears which are provided with the inlet filling ramps and trapping relief grooves. For metering operation, the pressure loading is derived from a single axial hole communicating with only one of the inlet fill slots to assure no flow communication between the four inlets. There are several different possible locations for this axial hole and the axial hole is shown at 175 in association with the bearing for the central gear 150. When the discharge pressure is higher, there could be a pair of axial holes positioned for communication with the discharge ports 165 and 166.

As in the construction of FIGS. 2–4, there are inlet and discharge seal arcs. These arcs are defined by lengths of the pump chamber walls at least equal in distance to the space between the tips of adjacent gear teeth. The inlet seal arcs are located between the leading edge of the inlet fill slots 160, 161, 170 and 171 and the intersection of the pump chambers 154, 155, and 156. The discharge seal arcs extend between the discharge ports 165 and 166 and the trailing edges of the inlet fill slots 160, 161, 170 and 171. The inlet seal arcs are shown at 180, 181, 182 and 183 and the discharge seal arcs are shown at 184, 185, 186 and 187.

The three-gear pump provides the improved results previously described in connection with the two-gear pump and with the additional advantage that four distinct inlet flow paths are achieved without any flow communication therebetween to achieve a greater flow capability with the use of three pumping elements.

We claim:

1. A dual inlet gear pump operable in either a pumping mode or a metering mode for scavenging fluid from a pair of compartment outlets and wherein the fluid at said compartment outlets may alternate between air or oil or a mixture thereof comprising, a pump housing having a pair of inlet ports for association one with each of said compartment outlets and a single discharge port, a pair of separate fill slots in said housing communicating one with each of said inlet ports, said housing having a pair of generally cylindrical pump chambers, a pair of rotatable meshing gears in said pump chambers which separately rotate past an associated fill slot to carry fluid to the discharge port, portions of the walls of said pump chambers defining inlet and discharge seal arcs for each gear to preclude any direct fluid communication between the inlet ports and between the inlet ports and the discharge port, said inlet seal arcs extending between the leading edge of each fill slot and the intersection of said pump chambers and at least equal to the spacing between adjacent gear tooth tips and the discharge seal arcs being at least equal to the spacing between adjacent gear tooth tips and extending between the discharge port and the trailing edge of the fill slots, bearing means pressure loaded against the end faces of the gears, and a passage through said bearing means which communicates with only one of said inlet ports when the pump is used in a metering mode to provide said pressure loading without creating a flow path between the inlet ports.

2. A dual inlet gear pump as defined in claim 1 including inlet filling ramps for progressive filling of gear tooth spaces.

3. A dual inlet gear pump as defined in claim 1 including trapping relief grooves communicating the discharge port with the area in which the gears come into fully-meshed relation.

4. A lubrication scavenge system for engine bearing compartments which are subject to negative and positive gravity forces and which contain oil and air comprising, a gear pump operable in either a pumping mode or a metering mode, said gear pump having a housing with three generally cylindrical pump chambers, a plurality of rotatable gears positioned one in each of said pump chambers with a central gear in mesh with each of a pair of outer gears to define four flow paths for fluid captured between gear teeth and the walls of the pump chambers with two of said flow paths being defined by teeth of said central gear, said housing having two pairs of inlet ports associated with fill slots with a first pair supplying fluid to said central gear and one of the outer gears, the other pair of inlet ports supplying fluid to said central gear and the other of said outer gears, a first discharge port in said housing for receiving fluid flow from the gears supplied with fluid by one of said first pair of inlet ports and one of said other pair of inlet ports, a second discharge port for receiving fluid flow from the central gear and the other of the outer gears, means defining inlet seal arcs at least equal to the spacing between adjacent gear tooth tips between the leading edge of each inlet fill slot and the intersection of the pump chambers containing said central gear and said outer gears to prevent communication between said fill slots, means defining discharge seal arcs at least equal to the spacing between adjacent gear tooth tips between the discharge ports and the trailing edge of the inlet fill slots, bearing means pressure loaded against the end faces of said gears, and means for directing fluid pressure within the pump to said bearing means without creating a flow path between said inlet ports which, with the pump operable in a metering mode, consists of a single passage through said bearing means which communicates with only one of said four inlet ports.

5. A lubrication scavenge system as defined in claim 4 including inlet filling ramps for progressive filling of gear tooth spaces.

6. A lubrication scavenge system as defined in claim 5 including trapping relief grooves communicating the discharge ports with the area in which the gears come into fully-meshed relation.

* * * * *